United States Patent [19]

Reist

[11] Patent Number: 4,536,200
[45] Date of Patent: Aug. 20, 1985

[54] GAS FILTER APPARATUS AND METHOD OF FILTERING

[76] Inventor: Parker C. Reist, 205 Glenhill La., Chapel Hill, N.C. 27514

[21] Appl. No.: 538,758

[22] Filed: Oct. 3, 1983

[51] Int. Cl.³ .................... B01D 46/02; B01D 50/00
[52] U.S. Cl. ............................................ 55/96; 55/97; 55/283; 55/302; 55/337
[58] Field of Search .............. 55/96, 97, 273, 283, 55/284, 287, 291, 302, 304, 337, 498; 15/304, 352; 134/37

[56] References Cited

U.S. PATENT DOCUMENTS

| | | | |
|---|---|---|---|
| 2,748,948 | 6/1956 | Fricke et al. | 210/169 |
| 3,073,097 | 1/1963 | Hallett et al. | 55/283 |
| 3,178,868 | 4/1965 | Gibby | 55/96 |
| 3,243,940 | 4/1966 | Larson | 55/96 |
| 3,368,328 | 2/1968 | Reinauer | 55/96 |
| 3,411,929 | 11/1968 | Garrett | 55/284 |
| 4,082,523 | 4/1978 | Pausch | 55/302 |
| 4,214,882 | 7/1980 | Brenholt | 55/283 |
| 4,218,227 | 8/1980 | Frey | 55/302 |
| 4,372,762 | 2/1983 | Cooley | 55/273 |

OTHER PUBLICATIONS

R. G. Neaman et al., Development and Operating Experience of Automatic Pulse-Jet Self-Cleaning Air Filters for Combustion Gas Turbines, contributed by the Gas Turbine Division of The American Society of Mechanical Engineers, presented Mar. 10–13, 1980, pp. 1–12.

Primary Examiner—David L. Lacey
Attorney, Agent, or Firm—B. B. Olive

[57] ABSTRACT

A gas filter apparatus and method utilize cylindrical pleated paper filters arranged to collect particulates on the interior of the filters from scavenging gas flowed through the filters. The particulates are removed by applying a high pressure gas pulse to an air chamber in a cylindrical housing surrounding each filter in spaced relation which forces the removed particulates axially through an open end of the filter.

10 Claims, 16 Drawing Figures

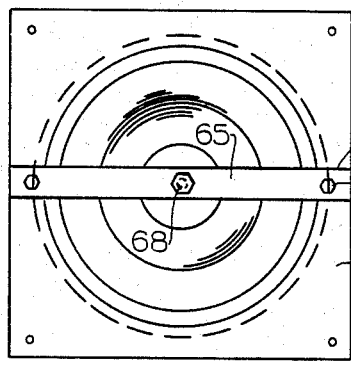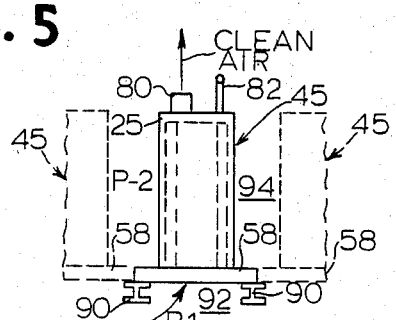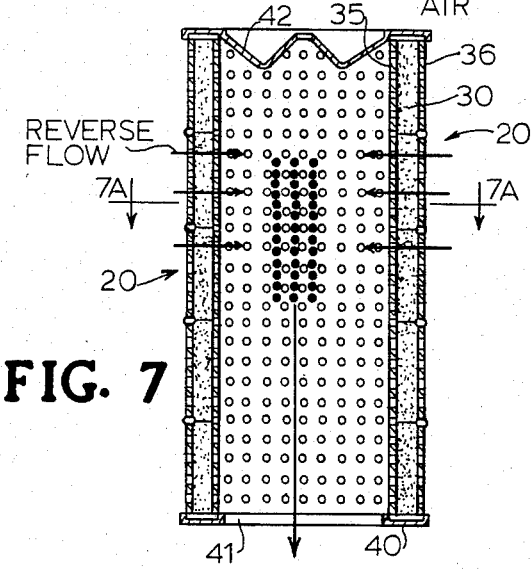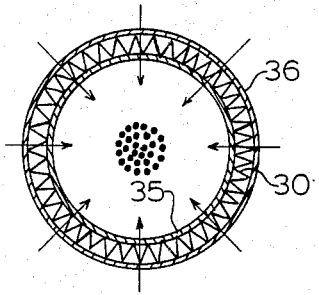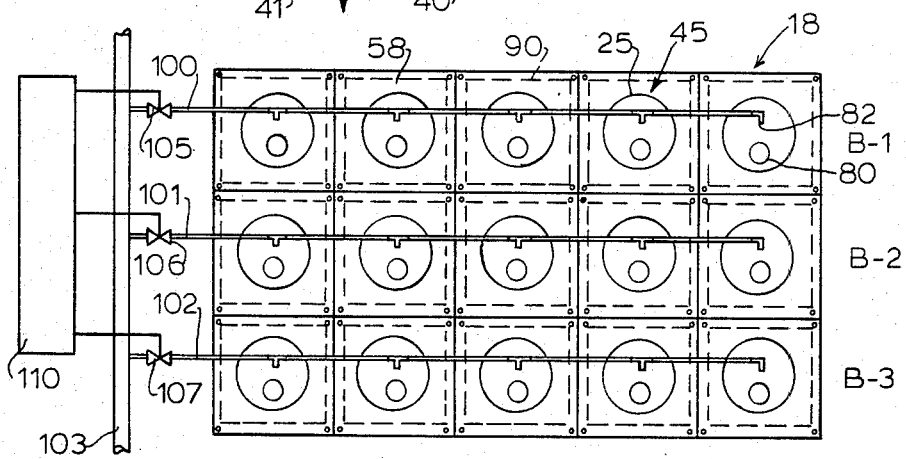

GAS FILTER APPARATUS AND METHOD OF FILTERING

DESCRIPTION

1. Technical Field

The invention relates broadly to gas filters, dust collectors, and the like, and more specifically to a pulse jet cleaned pleated paper filter apparatus, system and method for filtering air or other scavenging gases.

2. Background Art

U.S. Pat. No. 2,748,948 illustrates a pleated paper filter of a type useful in an air filter system such as illustrated in U.S. Pat. No. 4,218,227. Pleated paper filters of the type related to the invention comprise a hollow cylinder of pleated porous paper serving as a filter medium with one end closed and one end open. The advent of the pleated paper filter has lead to extensive application for the same, particularly in large air filter systems in which banks of pleated paper filters are employed such as illustrated in U.S. Pat. No. 4,218,227. While other patents relating to air or other gas filtration could be referred to, these two patents are believed to be sufficient to illustrate the state of the art insofar as it applies to the present invention. Another useful reference is the paper entitled "Development and Operating Experience of Automatic Pulse-Jet Self-Cleaning Air Filters for Combustion Gas Turbines" presented at the March 1980 ASME Gas Turbine Conference and Products Show. Since the present invention relates to a considerable extent to a filtering system in which the gas to be cleaned flows from the inside of a pleated paper filter to the outside, it is noted that the ASME reference teaches one such system but with no suggestion or teaching of the cleaning system and method of the present invention. Conventional household vacuum cleaners are also noted as using flexible bag filters and filtering by passing the dirty air from inside the filter bag to the outside.

Both of the patents referred to discuss the problem of cleaning the filter after there has been an accumulation of dust or other filtered particles on the pleated paper surfaces contacted by the scavenging gas, i.e., the dirty air or other contaminated gas being cleaned. The later patent, namely, U.S. Pat. No. 4,218,227 illustrates the use of a pulse jet arrangement to clean each of the system's individual pleated paper filters periodically to reduce contamination.

A widely employed practice for filtering air with pleated paper filter elements is to support each of the filter elements upright in the room area or plenum containing the scavenging gas with the closed end and outer surface of the filter surrounded by the scavenging gas and with the open end communicating with another enclosed space, room area or plenum containing the cleaned gas, e.g., clean air. Banks of filters are arranged this way. The scavenging gas plenum and the clean gas plenum are in gas flow communication only through flow paths established through the filters. A difference of pressure is established between the two plenums so that the scavenging gas, e.g., contaminated air, being filtered will be drawn through the outside of each pleated paper filter to the inside of the filter for discharge axially through the open end of the filters. The described prior art type of system and method of operation which follow the practice of filtering with the outside surfaces of a pleated paper filter inherently means that the particulates, i.e., the dust and other particles filtered out, will tend to cling to the outer pleated paper surfaces of each filter requiring periodic cleaning. The conventional pulse jet system incorporates for each filter an air jet source that can be periodically operated for each filter and a Venturi tube aligned with the filter axis and communicating with the open end of the filter and through which the air jet can be expelled. This jet periodically increases the air pressure inside the filter to establish a reverse flow and cause the dust particles and other particulates to be ejected from the outer pleated paper filter surfaces of the filter. The filter paper is made of sufficient strength to withstand such pressure. This arrangement has the advantage of being able to remotely control decontamination and cleaning of the filters by controlling the periodic operation of the air jets for respective filters or banks of filters.

When air jets are operated in the conventional pleated paper filter system having banks of filters arranged close together, the ejected particles to a substantial extent tend to drift laterally and often move from the outer filtering surfaces of one filter to the outer surfaces of another filter which inhibits both filtering and cleaning. It would thus be desirable to avoid mixing of particulates from one filter with the cleaning surfaces of another filter during the reverse jet cleaning operation.

In another aspect of the prior art, it is known that fine dust particles can in certain environments create hazardous conditions. Industrial fires have sometimes been attributed to improperly handled dust. Thus, it is desirable to minimize this risk in any filter system and some risk is recognized when particles are allowed to drift in space as mentioned above.

In later described and illustrated applications of the invention, the pleated paper filter housing unit of the invention is shown applied to a cyclone filter as a second stage filter, to a self-contained dust collector and to an engine filter. What is to be observed with respect to such applications is that while pleated paper filters have been used as second or primary stage filters in such applications, none of such applications have provided means for cleaning the filter when enclosed in a housing to which a compressed air pulse is applied as with the present invention.

With the foregoing background art in mind, the present invention seeks to provide a dramatically improved pleated paper filter system and cleaning method and apparatus arranged such that the contaminated air can be drawn from within the filter outwardly with the result that the filtered particulates are confined within the filter to minimize fire risk and cling to the internal pleated paper surfaces of each filter rather than to the external surfaces. The present invention also seeks as another object to provide a system in which there is no requirement for mounting a Venturi throat on the open end of each filter or for aligning the air cleaning jet with the central axis of the filter. Additionally, the present invention seeks to provide a pleated paper filter system in which each filter is confined during cleaning in a housing connected to a air jet source and surrounding the closed end and outer filter surfaces in spaced relation. Pulse jet cleaning can thus be effected according to the invention by periodically applying jet pressure around the outer surface of the filter to cause particles collected on the inner filter surfaces to be forced off such surfaces, to agglomerate as a particle mass within the filter and to move axially through the open end for collection. The cleaning action of the invention filter apparatus, system and method is intended to avoid the prior art practice of collecting the filtered particles on the outside surface of the filter and applying an excess pressure to the inside surfaces of the filter to remove the particles and inherently cause many of such particles to merely drift unconfined in space and move to adjacent filters to cling to other filter surfaces rather than be confined within the filter and removed as an agglomerate of particles as with the invention. These and other objects will become apparent as the description proceeds.

DISCLOSURE OF THE INVENTION

In a pulse jet cleaned pleated paper cartridge filter system, apparatus and method according to the invention, each pleated paper filter is housed at least during cleaning in what will be referred to as a cartridge housing. Such housing is an element of the reverse cleaning means of the invention, later described. In a preferred embodiment each filter is normally enclosed in a housing except when the cartridge filter is being replaced. In an alternative embodiment, the filter cartridge is placed in a housing only during cleaning. For the present description, the first embodiment is assumed to be the embodiment employed and scavenging air is assumed to be the gas being cleaned. All of the filter cartridges and filter cartridge housings associated with a particular air filter system are arranged with respect to the scavenging gas and clean gas plenums such that the air to be filtered is drawn through the inside of the filter, is forced through the pleated paper by moving from inside the filter, radially through the filter, to the space around the filter but within the filter housing surrounding the particular filter cartridge. The clean air is then expelled from the cartridge housing to an enclosed space, the outside, a room or other area in which clean air is desired, i.e., the clean air plenum. Whenever it is desired to clean the individual cartridge filters, provision is made for applying a pulse jet, e.g., a jet of compressed air, to each cartridge housing in some predetermined time sequence. Application of such pulse jet effectively establishes a high pressure pulse within the cartridge housing and around the outer surface of the particular filter being cleaned. This action in turn forces a substantial portion and in some cases, depending on the nature of the particulates, substantially all of the particulates now clinging to the inner surface of the filter to be ejected towards the central axis of the filter, collect as an agglomerate and fall by gravity for subsequent collection. During this reverse pulse jet cleaning operation, the housings for the respective cartridges are designed to be tightly clamped in position to provide hermetically sealed air chambers within the housings and around the paper filter cartridges such that the housings slightly flex and thus vibrate the pleated paper and amplify the pulse jet cleaning operation. The air jet in the illustrated embodiment is directed vertically downward along a vertical axis offset from the central vertical axis of the filter cartridge and so as to impinge on a disk which closes the end of the cartridge. This arrangement so far as can be observed appears to enhance vibration and loosening of the collected filtered particles. Also, it has not proven to be critical that the axis of the jet stream be axially aligned with the central axis of the filter whereas the Venturi-type cleaning arrangement of the prior art calls for such alignment.

In an alternative embodiment, the filter to be cleaned is surrounded by the housing only during the jet cleaning operation. Various applications of the invention are described, by way of example, in other embodiments illustrating how the invention pleated paper filter apparatus and method can be applied to a cyclone cleaner as a second stage filter, to a self-contained dust collecting unit and to engine air intake filtering.

BRIEF DESCRIPTION OF THE DRAWINGS

FIG. 5 is a bottom view of the cartridge housing unit of FIG. 1.

FIG. 6 is an elevation view illustrating schematically a typical form of support for the cartridge housing unit of FIG. 1.

FIG. 7 is a schematic illustration showing how jet air pulse removed particles tend, when removed, to agglomerate and discharge axially and downwardly as an agglomerate mass according to the invention.

FIG. 7A is a schematic top sectional view of the cartridge only taken along line 7A—7A of FIG. 7 to further illustrate how the particulates agglomerate during cleaning.

FIG. 8 is a schematic view of a pulse jet piping system and one form of nesting the filter cartridge units of the first embodiment of the invention.

BEST MODE FOR CARRYING OUT THE INVENTION

Figure 1:
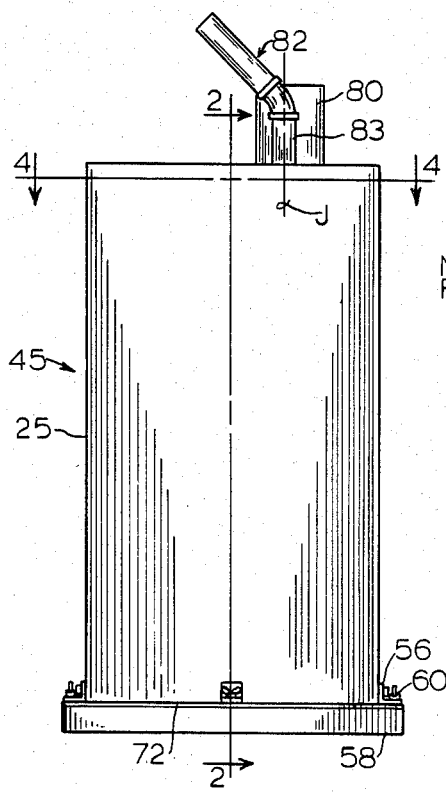
FIG. 1 is a side elevation view of a single pleated paper filter housing unit and jet cleaning apparatus according to a first embodiment of the invention.

Referring initially to FIGS. 1-8, a filter system 18 according to a first embodiment of the invention utilizes some selected number of cylindrical pleated paper filters 20, each of which is enclosed in a cylindrical housing 25 to form a filter-housing unit 45. Each filter 20 comprises a hollow cylinder 30 of pleated porous paper with the folds in the pleats running parallel to the longitudinal axis of the cylinder and with the first and last pleats being cemented or otherwise secured together. In the embodiment being used for illustrating the invention, the cylinder 30 is contained between an inner perforated metal screen 35 and an outer perforated metal screen 36. Note is made here that in other types of pleated paper filters to which the invention is applicable, the filter media, i.e., the pleated paper, is retained by coiled wire rather than by perforated metal screens as illustrated. The inner folds of the pleats are secured to the inner screen 35 at intervals along the cylinder by beads of adhesive and the outer folds are similarly secured to the outer screen 36 by other beads of adhesive. At the open lower end of the cylinder the screens 35, 36 and the pleats are secured to an annular ring 40 of imperforate material by adhesive and providing an opening 41 and at the opposite closed end the screens 35, 36 and the pleats are secured to a disk 42 of imperforate material by adhesive. Disk 42 closes the upper end of the filter element and has a central cone-shaped formation 48 which is apertured to pass a tie rod 50 secured to disk 42 by a wing nut 54.

Figure 2:
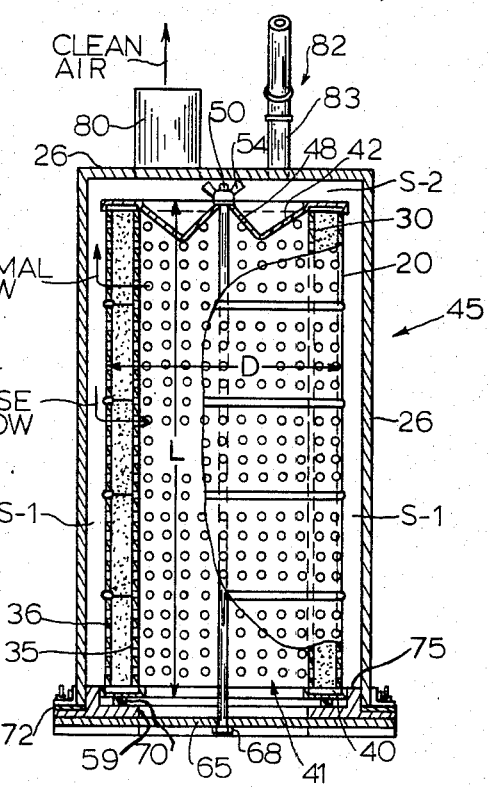
FIG. 2 is an elevation sectional view taken generally along line 2—2 of FIG. 1.
Figure 3:
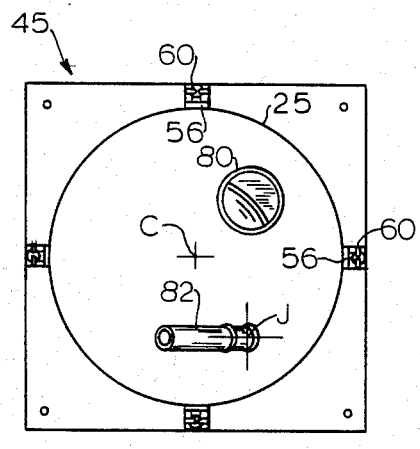
FIG. 3 is a top view of the cartridge housing unit shown in FIG. 1.
Figure 4:
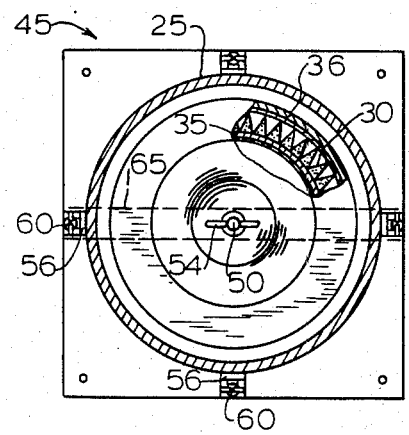
FIG. 4 is a top sectional view taken generally along line 4—4 of FIG. 1 and with certain portions cut away for illustration.

Housing 25 is formed of an imperforate material, e.g., sheet steel, with the upper end closed and the lower end open and is preferably at least slightly flexible when under the level of pressure, e.g., 80 p.s.i., and during the time to which it is briefly exposed, e.g., 50 milliseconds, to high pressure according to the invention. Housing 25 is fitted with brackets 56 and in the illustrated embodiment is secured to a uniform size, square shaped apertured base 58 by means of wing nuts 60 on threaded bolts secured to base 58. The aperture 59 in base 58 mates the open end of filter 20. The free end of tie rod 50 passes through a bar 65 mounted in notches 66 (FIG. 5) formed in the bottom of base 58. The tie rod 50 is secured to bar 65 by nut 68 and bar 65 is secured to base 58 by means of removable screws 67. The annular ring 40 rests on an annular seal 70 (FIG. 2) formed of rubber, or the like, and the open end of housing 25 rests on another annular seal 72 (FIG. 2). A rigid annular separator ring 75 formed on base 58 establishes a defined air space S-1 between the outer screen 36 and the inner surface of the housing 25. Housing 25 is also designed to provide additional air space S-2 between disk 42 and the inner surface of the end wall 26 of housing 25. A clean air exit tube 80 is mounted in end wall 26 for passage of clean air exiting the air spaces S-1 and S-2. End wall 26 also mounts an inlet pipe 82 for periodically receiving a pulse jet of high pressure air from a valve controlled source (FIG. 8) for the purpose of cleaning the filter paper 30 in the manner taught by the invention. Inlet pipe 82 terminates with a vertical discharge end 83 whose central axis J (FIG. 1) is parallel to and laterally offset from the filter central axis C (FIG. 3) and is arranged so as to direct the cleaning jet of air or other cleaning gas agent against the disk 42. Spaces S-1 and S-2 during this cleaning operation act as a hermetically sealed air chamber surrounding filter 20 and communicating with air exit tube 80 and jet air inlet pipe 82, the latter being normally closed by a remotely-controlled valve except when in use as in FIG. 8.

In an operating filter system such as system 18 illustrated in FIG. 8, each housing-filter unit 45 is supported on and, if necessary, secured to suitable structure such as the rails 90 in FIG. 6. The bases 58 are arranged as in FIG. 8 to establish a barrier such that flow paths through the pleated paper filters 20 provide the only gas flow path between the area of contaminated air containing the air to be filtered, i.e., the scavenging gas plenum 92 (FIG. 6) which could be open to the atmosphere in some cases, and the area of clean air containing the air which has been filtered, i.e., the normally-enclosed clean air plenum 94 (FIG. 6). A pressure differential is normally established between the pressure P-1 in the scavenging air plenum 92 (FIG. 6) and the pressure P-2 in the clean air plenum 94 (FIG. 6) to ensure that scavenging air tends to flow upwardly in the example of FIGS. 6 and 8 so as to normally flow through the inner screen 35, through the inner surfaces of porous filter paper 30, through the outer porous screen 36, into the space S-1, to the space S-2 and out the clean air exhaust pipe 80 for each of the filter-housing units 45.

The filter system 18 of FIG. 8 by way of illustration comprises five housing filter units 45 in bank B-1, another set of five housing filter units 45 in bank B-2 and a third set of five housing filter units 45 in bank B-3. The respective air jet inlets 82 for filter units 45 are fed by separate air lines 100, 101 and 102 for each of the respective separate banks of filters, B-1, B-2 and B-3. Lines 100, 101, 102 connect to a gas supply line 103 which in the embodiment being described is assumed to represent a source of pressurized clean air. However, supply line 103 may be a source of a clean inert gas or any other gas suited to use as a cleaning gas according to the invention. The use of an inert gas may be preferable, for example, in handling certain kinds of fine dust to minimize hazardous conditions. Each respective air line 100, 101 and 102 is controlled through separate remotely controllable air valves 105, 106 and 107 connected to a suitable air valve time control generally designated 110. Since the general practice of arranging pleated paper filters in banks and connecting separate air jet sources to each bank and applying an air jet to each bank separately in some predetermined time relation is known for the prior art method of cleaning, this aspect of the invention system will be understood by those skilled in the art without further explanation. What is particularly important to recognize in the present invention is the fact that the air jet, instead of being admitted to a centrally-positioned Venturi throat on each filter which carries high pressure air into the center of the filter element as for example in U.S. Pat. No. 4,218,227, is admitted through an air jet discharge inlet offset from the center of the filter element to a housing, i.e., housing 25 for creating a high pressure pulse in the previously-mentioned air chamber spaces S-1 and S-2 surrounding the outer filter surfaces of pleated paper filter 30. Thus, when a high pressure is created in the spaces S-1 and S-2, dirt, dust and other particulates which have collected on the inner surface of inner screen 35 and on the inner surfaces of the pleated paper filter 30 will be expelled, as schematically illustrated by the black dots and pulse jet air stream arrows in FIGS. 7 and 7A, into the area confined by the inner screen 35, will agglomerate and will tend to drop axially downwardly through each respective filter opening 41 under the influence of gravity for appropriate collection by means known in the art and not otherwise illustrated. It will also be noted that during this jet reverse, flow-cleaning operation, the removed particulates whether in the nature of dust, dirt or other particle form, are essentially isolated from migrating toward other filter-housing units 45 thus achieving one of the principal objects of the invention.

In one actual operating model, made according to FIGS. 1-5, a fifteen gallon steel drum was used for housing 25 and a pleated paper filter element designated by part number A37636B1 sold by Pneumafil Corporation of Charlotte, N.C., was used for the filter unit 20. The filter unit 20 had an outside dimension D (FIG. 2) of approximately 12½ inches, an overall length L of approximately 46 inches, and opening 41 was approximately 8½ inches in diameter. The pleated paper filter 30 was cleaned with a short pulse of approximately 50 millisecond duration of high pressure air at approximately 80 p.s.i. which caused the filtered out particles on the inner surface of filter paper 30 to be released to the clean side of the filter, agglomerate in the center of the filter and fall as illustrated in FIGS. 7 and 7A. It was also noticed that the shock wave from the compressed air passed into the air spaces S-1, S-2 tended to expand the space S-1 by flexing the metal forming the sidewall 26 (FIG. 2) of the housing 25. Additionally, the filter media 30 was noticeably vibrated. As the housing 25 returned to its normal position additional cleaning motion was noted as the pressure pulse dissipated through the filter 20 and the expanded air moved out through the air exit tube 80. During the cleaning cycle it also appeared that the rate of air flow being discharged from the filter unit through air exit tube 80 remained essentially constant.

Limited test data are presented to demonstrate the performance of the system. For these tests a single filter-housing unit 45 was set up. Test dust (agricultural grade limestone, mean particle diameter about 1.3 micrometers, geometric standard deviation about 2.5) was mixed into 1200 cfm of air at a rate of approximately 43 grams per minute. This gave an upstream or dirty side concentration of 1.27 grams per cubic meter. Air was drawn from this sample stream through opening 41 into the filter unit 20 at a rate of 425 cfm. The initial pressure drop across the filter paper 30 was 1.16 inches of water. The filter-housing unit 45 was loaded with dust at this flow rate until a pressure drop of 2.5 inches of water was reached. This took about 12.8 hours. When a pressure drop of 2.5 inches of water was reached, the filter paper 30 was pulse cleaned with a single pulse of compressed air at a pressure of 80 psi for approximately 50 milliseconds. A reduction in pressure of 0.8 inches of water was observed. The loading was continued until 2.5 inches was again reached and then the filter was again pulsed, following which the sequence was repeated. Table I lists the experimental data from these cycles.

TABLE I

| Time Between Pulses (Minutes) | Pressure Drop (Inches of Water) | |
| --- | --- | --- |
| | Before Cleaning | After Cleaning |
| — | 2.5 | 1.7 |
| 124 | 2.5 | 1.9 |
| 42 | 2.5 | 2.0 |
| 135 | 2.5 | 2.0 |
| 54 | 2.5 | 2.1 |
| 36 | 2.5 | 2.2 |
| 26 | 2.5 | 2.2 |
| 14 | 2.5 | 2.2 |
| 13 | 2.5 | 2.2 |
| 15 | 2.5 | 2.2 |

For the last six tests the dust concentration was estimated to be 1.15 grams per cubic meter.

The data indicates that pulsing cleaned the filter in the manner of FIGS. 7 and 7A since the pressure drop is seen to be less after than before cleaning and that an equilibrium condition was reached or was nearly reached as indicated by the pressure drop being less after than before cleaning and by the stable series of pressure drops of 2.2 inches of water after cleaning. It is also interesting to note that these tests were carried out on a single filter-housing unit 45 and that the flow through the filter paper 30 was not stopped during pulsing. With a conventional pulse jet system, it is known that pulse cleaning will not work with a single filter configuration unless the flow is stopped during pulsing.

Figure 9:
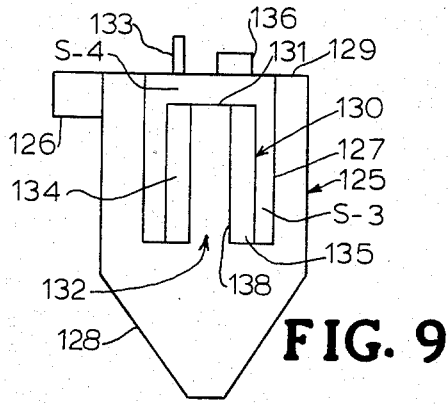
FIG. 9 is a simplified schematic diagram of a cyclone-type filter combined with a cartridge-type housing unit as a second stage filter according to a second embodiment of the invention.
Figure 10:
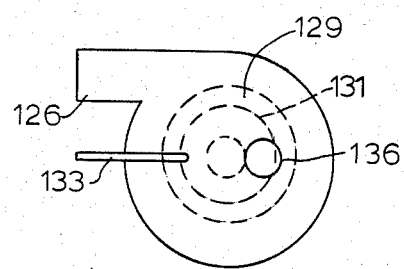
FIG. 10 is a plan view of the cyclone filter arrangement of FIG. 9.

Referring next to FIG. 9, there is schematically illustrated a conventional cyclone cleaner 125 having an inlet 126 in which contaminated scavenging air, gas or the like is received for being whirled in the cyclone cleaner as the primary cleaning stage such that the large particles tend to collect in the inverted conical section 128. In order to provide an auxiliary second stage cleaning action the conventional cyclone cleaner 125 depicted in FIG. 9 also has its imperforate housing 127 closed by the top wall 129 and has supported within the housing in a spaced relation a pleated paper filter unit 130 having a closed end 131 similar to the previously-described filter 20. A clean air outlet 136 is mounted in the top wall 129 as illustrated together with a timed, valve-controlled, pulse air jet inlet 133. From the prior description, it will be appreciated that the air or gas which has been cleaned of the larger particulates by the conventional cyclone action can pass upwardly through the open end 132 of filter unit 130 to the area within the pleated paper filter 130, through the pleated paper filter medium 134, into the surrounding air spaces S-3, S-4 and out through the clean air outlet 136. As with the single filter unit illustrated in FIGS. 1–6, a reverse cleaning operation can be effected by admitting an air jet pulse through the inlet pipe 133 so as to create substantially high pressure in the spaces S-3, S-4 thereby forcing the particulates from the inner screen wall 138 downwardly as an agglomerate into the collection cone 128.

Figure 11:
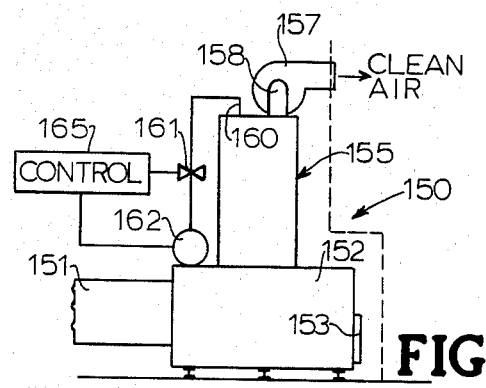
FIG. 11 is a schematic view of a self-contained dust collector apparatus combined with a cartridge filter housing unit according to a third embodiment of the invention.

FIG. 11 in another representative application of the invention schematically represents a self-contained dust collector apparatus 150 having an intake 151 for receiving contaminated, i.e., dust-filled, air and mounted on the dust collector bin 152, fitted with dust removal door 153, an air filter unit 155 generally constructed according to the invention as previously explained. Air filter unit 155 is provided with a clean air outlet 158 and an air jet inlet 160 supplied by an electric or engine-driven compressor 162 with a suitable control 165. In operation, it will be understood that the scavenging gas, e.g., contaminated air, is admitted through inlet 151, is cleaned by the air filter unit 155 as previously explained and the clean air is discharged with the assistance of blower 157 through the clean air outlet 158. In this application, however, the source of reverse flow for cleaning is provided by the compressor 162 admitting a jet pulse to the inlet 160 through valve 161 as controlled by said control 165. Control 165 could for example be controlled by pressure measurements such that compressor 162 is energized and provides a jet pulse to inlet 160 dependent on the degree of contamination or pressure drop. The specific advantage of FIG. 11 is that FIG. 11 illustrates a system utilizing the air filter unit of the invention adapted to be made in an essentially self-contained system useful in remote areas and the like.

Figure 12:
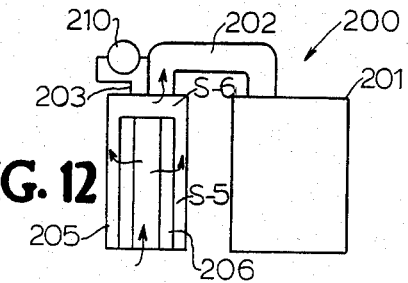
FIG. 12 is a schematic diagram illustrating use of the cartridge filter housing unit of the invention for vehicular engine air cleaning in a fourth embodiment.

FIG. 12 is a further schematic illustration indicating a system suitable for large vehicular application in dusty driving conditions. In FIG. 12 the cleaning system 200 is connected to provide clean air to an engine 201 through a connecting pipe 202. The contaminated air to be cleaned is admitted through the bottom of a housing 205 so as to pass through a pleated paper filter unit 206 into the spaces S-5, S-6 and then to the clean air outlet pipe 202. Reverse pulse jet cleaning in the application of FIG. 12 is effected by means of a source of compressed air 210 connected to draw clean air from the outer pipe 202 and discharge such clean air through air jet inlet 203 into the space S-6 as a pulse jet in the manner previously described.

While it is anticipated that commercial application of the invention will be in systems in which the housings 25 are secured to an apertured base such as base 58, to an apertured floor, or other means separating scavenging and clean plenums, the invention recognizes that the housings 25 and connected air jet line 82 are primarily useful only during cleaning and thus can be lifted from the filter 20 when not required for cleaning. Such further application of the invention is somewhat schematically illustrated in FIGS. 13 and 14.

Figure 13:
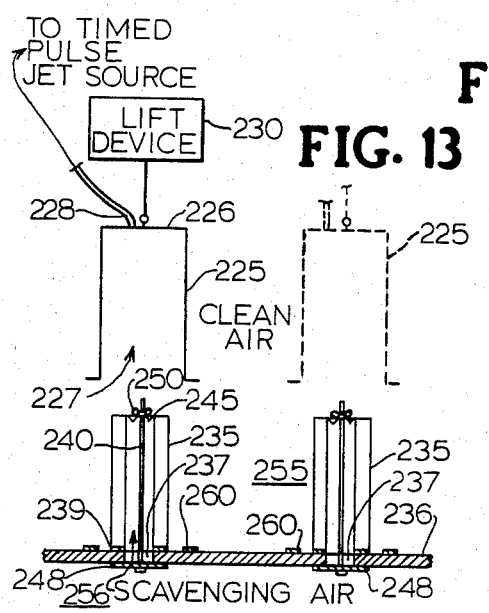
FIG. 13 is a schematic diagram illustrating how the cartridge filter housing unit of the invention can be arranged to be used only during cleaning according to a fifth embodiment.
Figure 14:
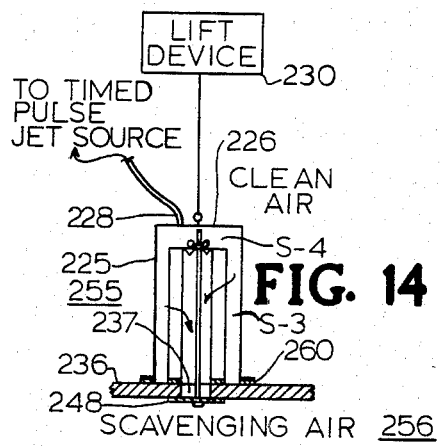
FIG. 14 is a schematic diagram illustrating the FIG. 13 housing arrangement in use during cleaning of the filter.

In FIG. 13 there is illustrated a housing 225 such as a heavy steel drum having in the upper closed end 226 a flexible pipe connection 228 to a timed pulse jet source and supported by a suitable lift device 230. Lift device 230 may be in the nature of a cable hoist connected to lower and raise housing 225 as illustrated, may be a hydraulic or air cylinder, not shown, connected to raise and lower housing 225 or may be any other similarly suited mechanism. The open lower end 227 of housing 225 resides over a pleated paper filter cartridge 235 of the type previously described secured to a floor 236 having an aperture 237 mating the open end of cartridge 235 and sealed by seal 239. A vertical tie rod 240 passes through the closed end 245 of cartridge 235 and through a tie bar 248 held in clamped relation to floor 236 by wing nut 250. In this mode, a pressure differential is established between the illustrated clean air and scavenging air plenums 255, 256 separated by floor 236 such that the scavenging air flows upwardly through floor opening 237, through the pleated paper filter cartridge 235 and to the clean air plenum 255. For cleaning, the housing 225 is lowered against the annular seal 260 as in FIG. 14 and, if necessary, pressed against floor 236 by suitable means, not shown, so as to establish a hermetically sealed air chamber formed by spaces S-3, S-4 surrounding the outer filter surfaces of filter cartridge 235. Following admission of a brief pulse of jet air as previously described, the particles tend to agglomerate and fall as illustrated in FIGS. 7, 7A and 14 after which housing 225 may be removed and the filtering process of FIG. 13 renewed. Alternatively, housing 225 may be equipped with a clean air outlet, not shown, such that the filtering process can continue substantially uninterrupted during the cleaning process as previously described.

Figure 15:
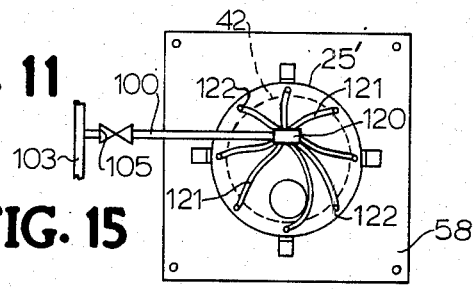
FIG. 15 is a schematic view showing in a sixth embodiment a single cartridge housing unit arranged with a plurality of peripherally-arranged cleaning jets.

In the embodiments thus far described, the pulse jet has been shown and described as being admitted through a single jet discharge exhaust pipe. Recognition is given in FIG. 15 to an alternative arrangement showing a portion of the system 18 of FIG. 8 in which an alternative housing 25' is shown secured to a base 58. In this alternative arrangement, the housing 25' is fed pulsed air from the previously referred to gas supply line 103, through control valve 105, through pipe 100, through manifold coupling 120, through plural flexible air feed lines 121, and through a plurality of vertical air jet exhaust pipes 122 positioned around the periphery of housing 25' so as to exhaust the jet air directly into the space S-1 in the embodiment of FIG. 1 or in the space S-3 of the embodiment of FIG. 14. The FIG. 15 arrangement is seen as being advantageous in offering a means in some applications for obtaining the desired high pulse pressure more rapidly and equalizing such pressure more rapidly than when the single jet exhaust system previously described is used.

In summary, the invention pleated paper filter apparatus, system and method are seen to offer the following advantages:

(1) The cleaning process can be effected with minimum or no contamination of one filter by another filter.
(2) The cleaning process can be effected in a manner tending to cause the removed particles to agglomerate and remove themselves under the influence of gravity as an agglomerate mass.
(3) The need for centrally-aligned Venturi tubes is eliminated.
(4) Single or multiple filter cartridges can be cleaned without interrupting the normal cleaning flow.
(5) A single jet air equipped housing can be used to clean individual pleated paper filter cartridges without requiring that such housing remain on the individual filter cartridges during normal filtering.
(6) Cleaning of the pleated paper filter is enhanced by reason of the vibrations induced in the filter pleats by flexing of the housing during cleaning.
(7) The quantity of removed particulates free to be redeposited on a cleaned filter is minimized.
(8) The removed particulates are effectively confined within the filter until they fall by gravity into the scavenging gas plenum and are free of the filter from which they were removed.
(9) The invention system readily adapts to cyclone cleaners for second stage filtering, to self-contained dust collectors, to large engine air intake filters, and the like.
(10) While air is normally the gas filtered as well as the gas used for cleaning, it is known that pleated paper filters readily pass other type gases therefore adapting the invention to a range of gases other than air.
(11) While primarily intended for use with pleated paper filters, those skilled in the art will readily appreciate application of the invention to other types of filters adapted to be enclosed in a housing such that a high pressure pulse can be applied to one clean side of the filter to loosen collected particulates on an opposite side of the filter as with the invention.
(12) Both single and multiple jet inlets may be employed to accommodate to varying requirements.
(13) Provides an overall reverse jet cleaning means in which the described housing means forms an element.

What is claimed is:

1. A gas-filtering apparatus for filtering particulate-laden gas, comprising:
   (a) a first clean air plenum to which filtered gas is admitted, a second scavenging gas plenum isolated from said first plenum for containing unfiltered scavenging gas and having a barrier between said plenums with apertures communicating said plenums for gas flow therebetween;
   (b) a plurality of filters located for filtering said scavenging gas, each of a standard cylindrical construction comprising a hollow cylinder of pleated porous filter paper including means serving to restrain movement of said paper and having one closed end and one open end;

(c) means mounting each said filter on said barrier such that the outer surface thereof communicates with said first plenum and the inner surface and open end thereof communicates with said second plenum through one of said apertures;

(d) means for exhausting air from said first plenum so that in normal flow gas flows through said apertures and through the open end of each said filter to the interior of each said filter and radially through each said filter such that particulates collect on the interior surfaces thereof; and (e) reverse jet cleaning means for cleaning said filters, including:
  (i) for each of said filters a cylindrical housing, each housing being mounted on said barrier and defining said first plenum and surrounding external surfaces of one of said filters in a predetermined spaced relation and being effective to seal off one of said filters from another;
  (ii) a source of high pressure gas;
  (iii) conduit means having a control valve and connecting the space surrounding a filter within each said housing to said source of high pressure gas; and
  (iv) means for operating said control valve to produce a brief pulse of said high pressure gas for periodically removing particulate matter collected on the interior surfaces of each said filter within one of said housing and causing such removed particulate matter to drop through the open end thereof by directing a said brief pulse of high pressure gas into each said housing to cause such high pressure gas to flow radially inward through each said filter within each said housing in a direction and flow reverse to said normal flow.

2. A gas-filtering apparatus as claimed in claim 1 wherein each said housing mounted on said barrier is secured thereto.

3. A gas-filtering apparatus as claimed in claim 1 wherein said filter mounting means includes for each said filter a uniform size rectangular base member secured to a respective said filter at the open end thereof, said base member forming a portion of said barrier and having an aperture therethrough forming one of the said apertures of said barrier communicating said first and second plenums.

4. A gas-filtering apparatus as claimed in claim 1 wherein each said housing has one end closed and one end open and said housing open end is secured to said barrier and is positioned with respect to said filter such that said housing provides predetermined size spaces, both between the respective closed end of said housing and the respective closed end of said filter enclosed thereby and between said housing and the outer cylindrical surface of the respective said filter.

5. A gas-filtering apparatus as claimed in claim 1 wherein each said housing enclosing a said filter is removably secured to said barrier.

6. A method of filtering particulate-laden gas, comprising the steps of:
  (a) drawing the particulate-laden gas axially through the open end of a cylindrically-shaped filter having a hollow cylinder of pleated porous filter sheet material with means to restrain movement of said filter sheet material and having the opposite end closed and radially outward through the sheet material whereby to allow the filtered particulates to collect on the inner surfaces thereof;
  (b) enclosing said filter including said hollow cylinder of filter sheet material in a cylindrical housing so as to enclose and establish an air chamber around and spaced from the outer surfaces and closed end of said filter;
  (c) admitting a brief pulse of high pressure gas to said chamber and allowing such high pressure gas to flow radially inward through said sheet material for removing the collected said particulates from the inner surfaces of said sheet material and allowing such removed particulates to discharge axially through the said open end of said filter; and
  (d) during admission of said pulse of gas continuing the drawing of the particulate-laden gas through said open end of said filter.

7. The method of claim 6 wherein said housing includes an outlet and including the steps of maintaining said housing around said filter and expelling filtered gas through said outlet when not cleaning said filter with said pulse.

8. The method of claim 7 including the step of allowing filtered gas to continue to flow through said outlet during the cleaning of said filter.

9. The method of claim 6 wherein said removed particulates are discharged under the influence of gravity.

10. The method of claim 6 wherein said sheet material comprises paper.

* * * * *